US006469511B1

(12) United States Patent
Vonderhaar et al.

(10) Patent No.: US 6,469,511 B1
(45) Date of Patent: Oct. 22, 2002

(54) BATTERY CLAMP WITH EMBEDDED ENVIRONMENT SENSOR

(75) Inventors: J. David Vonderhaar, Bolingbrook; Kevin I. Bertness, Batavia, both of IL (US)

(73) Assignee: Midtronics, Inc., Willowbrook, IL (US)

( * ) Notice: Subject to any disclaimer, the term of this patent is extended or adjusted under 35 U.S.C. 154(b) by 0 days.

(21) Appl. No.: 09/908,278

(22) Filed: Jul. 18, 2001

(51) Int. Cl.[7] .................... H01M 10/44; H01M 10/46
(52) U.S. Cl. ................ 324/425; 320/147; 320/DIG. 17
(58) Field of Search ........................... 324/425, 426, 324/431, 432, 438; 361/619, 620; 320/132, 147, 150, DIG. 17, DIG. 21

(56) References Cited

U.S. PATENT DOCUMENTS

| 2,514,745 A | 7/1950 | Dalzell ..................... 171/95 |
| 3,356,936 A | 12/1967 | Smith ..................... 324/29.5 |
| 3,562,634 A | 2/1971 | Latner ........................ 31/4 |
| 3,593,099 A | 7/1971 | Scholl ........................ 320/13 |
| 3,607,673 A | 9/1971 | Seyl .......................... 204/1 |
| 3,676,770 A | 7/1972 | Sharaf et al. .............. 324/29.5 |
| 3,729,989 A | 5/1973 | Little ........................ 73/133 |
| 3,753,094 A | 8/1973 | Furuishi et al. ............ 324/29.5 |
| 3,808,522 A | 4/1974 | Sharaf ..................... 324/29.5 |
| 3,811,089 A | 5/1974 | Strezelewicz ............... 324/170 |
| 3,873,911 A | 3/1975 | Champlin ................. 324/29.5 |
| 3,876,931 A | 4/1975 | Godshalk .................. 324/29.5 |
| 3,886,443 A | 5/1975 | Miyakawa et al. ......... 324/29.5 |
| 3,889,248 A | 6/1975 | Ritter ........................ 340/249 |
| 3,906,329 A | 9/1975 | Bader ........................ 320/44 |
| 3,909,708 A | 9/1975 | Champlin ................. 324/29.5 |
| 3,936,744 A | 2/1976 | Perlmutter ................. 324/158 |
| 3,946,299 A | 3/1976 | Christianson et al. ........ 320/43 |
| 3,947,757 A | 3/1976 | Grube et al. ................ 324/28 |
| 3,969,667 A | 7/1976 | McWilliams .............. 324/29.5 |
| 3,979,664 A | 9/1976 | Harris ....................... 324/17 |
| 3,984,762 A | 10/1976 | Dowgiallo, Jr. ............ 324/29.5 |
| 3,984,768 A | 10/1976 | Staples ...................... 324/62 |
| 3,989,544 A | 11/1976 | Santo ........................ 429/65 |
| 4,008,619 A | 2/1977 | Alcaide et al. .............. 73/398 |
| 4,053,824 A | 10/1977 | Dupuis et al. .............. 324/29.5 |
| 4,070,624 A | 1/1978 | Taylor ...................... 327/158 |
| 4,086,531 A | 4/1978 | Bernier ..................... 324/158 |
| 4,112,351 A | 9/1978 | Back et al. ................. 324/16 |
| 4,114,083 A | 9/1978 | Benham et al. ............. 320/39 |
| 4,126,874 A | 11/1978 | Suzuki et al. .............. 354/60 |
| 4,178,546 A | 12/1979 | Hulls et al. ................ 324/158 |
| 4,193,025 A | 3/1980 | Frailing et al. ............. 324/427 |
| 4,207,611 A | 6/1980 | Gordon ..................... 364/580 |
| 4,217,645 A | 8/1980 | Barry et al. ................ 364/483 |
| 4,315,204 A | 2/1982 | Sievers et al. .............. 322/28 |
| 4,316,185 A | 2/1982 | Watrous et al. ............. 340/636 |
| 4,322,685 A | 3/1982 | Frailing et al. ............. 324/429 |
| 4,351,405 A | 9/1982 | Fields et al. ................ 180/65 |
| 4,363,407 A | 12/1982 | Barkler et al. ............. 209/3.3 |
| 4,369,407 A | 1/1983 | Korbell ..................... 324/416 |
| 4,379,989 A | 4/1983 | Kurz et al. |
| 4,379,990 A | 4/1983 | Sievers et al. .............. 322/99 |
| 4,390,828 A | 6/1983 | Converse et al. ............ 320/32 |
| 4,392,101 A | 7/1983 | Saar et al. .................. 320/20 |
| 4,396,880 A | 8/1983 | Windebank ................. 320/21 |
| 4,408,157 A | 10/1983 | Beaubien .................... 324/62 |
| 4,412,169 A | 10/1983 | Dell'Orto ................... 320/64 |
| 4,423,378 A | 12/1983 | Marino et al. ............. 324/427 |
| 4,423,379 A | 12/1983 | Jacobs et al. .............. 324/429 |

(List continued on next page.)

FOREIGN PATENT DOCUMENTS

| DE | 29 26 716 B1 | 1/1981 |
| EP | 0 022 450 A1 | 1/1981 |
| EP | 0 637 754 A1 | 2/1995 |
| EP | 0 772 056 A1 | 5/1997 |
| FR | 2 749 397 | 12/1997 |
| GB | 2 088 159 A | 6/1982 |
| JP | 59-17892 | 1/1984 |
| JP | 59-17893 | 1/1984 |
| JP | 59-17894 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04131779 | 5/1992 |
| JP | 04372536 | 12/1992 |
| JP | 5216550 | 8/1993 |
| JP | 7-128414 | 5/1995 |
| WO | WO 93/22666 | 11/1993 |
| WO | WO 94/05069 | 3/1994 |
| WO | WO 98/58270 | 12/1998 |
| WO | WO 99/23738 | 5/1999 |

OTHER PUBLICATIONS

National Semiconductor Corporation, "High Q Notch Filter", 3/69, Linear Brief 5, Mar. 1969.

Burr–Brown Corporation, "Design A 60 Hz Notch Filter with the UAF42", 1/94, AB–071, 1994.

National Semiconductor Corporation, "LMF90–4th –Order Elliptic Notch Filter", 12/94, RRD–B30M115, Dec. 1994.

"Performance of Dry Cells", by C. Hambuechen, Preprint of Am. electrochem. Soc., Apr. 18–20, 1912, paper No. 19, pp. 1–5.

(List continued on next page.)

Primary Examiner—Edward H. Tso
(74) Attorney, Agent, or Firm—Westman, Champlin & Kelly, P.A.

(57) ABSTRACT

An apparatus configured to couple to a battery contact is provided. The apparatus includes an electrical connector for connection to a battery contact and an environment sensor integrated with the electrical connector, the environment sensor senses changes in a battery environment during battery charging or testing. In addition, a method of coupling an electrical circuit to a battery contact is provided.

33 Claims, 8 Drawing Sheets

U.S. PATENT DOCUMENTS

| | | | |
|---|---|---|---|
| 4,424,491 A | 1/1984 | Bobbett et al. | 324/433 |
| 4,459,548 A | 7/1984 | Lentz et al. | 324/158 |
| 4,514,694 A | 4/1985 | Finger | 324/429 |
| 4,520,353 A | 5/1985 | McAuliffe | 340/636 |
| 4,633,418 A | 12/1986 | Bishop | 364/554 |
| 4,659,977 A | 4/1987 | Kissel et al. | 320/64 |
| 4,663,580 A | 5/1987 | Wortman | |
| 4,667,143 A | 5/1987 | Cooper et al. | |
| 4,667,279 A | 5/1987 | Maier | 363/46 |
| 4,678,998 A | 7/1987 | Muramatsu | 324/427 |
| 4,679,000 A | 7/1987 | Clark | 324/428 |
| 4,680,528 A | 7/1987 | Mikami et al. | |
| 4,697,134 A | 9/1987 | Burkum et al. | 320/48 |
| 4,707,795 A | 11/1987 | Alber et al. | 364/550 |
| 4,709,202 A | 11/1987 | Koenck et al. | 320/43 |
| 4,710,861 A | 12/1987 | Kanner | 363/46 |
| 4,719,428 A | 1/1988 | Liebermann | 324/436 |
| 4,743,855 A | 5/1988 | Randin et al. | 324/430 |
| 4,745,349 A | 5/1988 | Palanisamy et al. | 320/22 |
| 4,816,768 A | 3/1989 | Champlin | 324/428 |
| 4,820,966 A | 4/1989 | Fridman | 320/32 |
| 4,825,170 A | 4/1989 | Champlin | 324/436 |
| 4,847,547 A | 7/1989 | Eng, Jr. | |
| 4,849,700 A | 7/1989 | Morioka et al. | 324/427 |
| 4,876,495 A | 10/1989 | Palanisamy et al. | 320/18 |
| 4,881,038 A | 11/1989 | Champlin | 324/426 |
| 4,912,416 A | 3/1990 | Champlin | 324/430 |
| 4,913,116 A | 4/1990 | Katogi et al. | 123/425 |
| 4,929,931 A | 5/1990 | McCuen | 340/636 |
| 4,931,738 A | 6/1990 | MacIntyre et al. | 324/435 |
| 4,937,528 A | 6/1990 | Palanisamy | 324/430 |
| 4,947,124 A | 8/1990 | Hauser | 324/430 |
| 4,956,597 A | 9/1990 | Heavey et al. | 320/14 |
| 4,968,941 A | 11/1990 | Rogers | 324/428 |
| 4,968,942 A | 11/1990 | Palanisamy | 324/428 |
| 5,004,979 A | 4/1991 | Marino et al. | 324/160 |
| 5,032,825 A | 7/1991 | Xuznicki | 340/636 |
| 5,037,778 A | 8/1991 | Stark et al. | 437/216 |
| 5,047,722 A | 9/1991 | Wurst et al. | 324/430 |
| 5,087,881 A | 2/1992 | Peacock | 324/378 |
| 5,095,223 A | 3/1992 | Thomas | 307/110 |
| 5,126,675 A | 6/1992 | Yang | 324/435 |
| 5,140,269 A | 8/1992 | Champlin | 324/433 |
| 5,144,218 A | 9/1992 | Bosscha | 320/44 |
| 5,144,248 A | 9/1992 | Alexandres et al. | 324/428 |
| 5,160,881 A | 11/1992 | Schramm et al. | 322/7 |
| 5,170,124 A | 12/1992 | Blair et al. | 324/434 |
| 5,179,335 A | 1/1993 | Nor | 320/21 |
| 5,194,799 A | 3/1993 | Tomantschger | 320/2 |
| 5,204,611 A | 4/1993 | Nor et al. | 320/21 |
| 5,214,370 A | 5/1993 | Harm et al. | 320/35 |
| 5,214,385 A | 5/1993 | Gabriel et al. | 324/434 |
| 5,241,275 A | 8/1993 | Fang | 324/430 |
| 5,254,952 A | 10/1993 | Salley et al. | 324/429 |
| 5,266,880 A | 11/1993 | Newland | 320/14 |
| 5,281,919 A | 1/1994 | Palanisamy | 324/427 |
| 5,281,920 A | 1/1994 | Wurst | 324/430 |
| 5,295,078 A | 3/1994 | Stich et al. | 364/483 |
| 5,298,797 A | 3/1994 | Redl | 307/246 |
| 5,300,874 A | 4/1994 | Shimamoto et al. | 320/15 |
| 5,302,902 A | 4/1994 | Groehl | 324/434 |
| 5,315,287 A | 5/1994 | Sol | 340/455 |
| 5,321,626 A | 6/1994 | Palladino | 364/483 |
| 5,331,268 A | 7/1994 | Patino et al. | 320/20 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/35 |
| 5,343,380 A | 8/1994 | Champlin | 363/46 |
| 5,347,163 A | 9/1994 | Yoshimura | 307/66 |
| 5,352,968 A | 10/1994 | Reni et al. | 320/35 |
| 5,365,160 A | 11/1994 | Leppo et al. | 320/22 |
| 5,365,453 A | 11/1994 | Startup et al. | 364/481 |
| 5,381,096 A | 1/1995 | Hirzel | 324/427 |
| 5,412,323 A | 5/1995 | Kato et al. | 324/429 |
| 5,426,371 A | 6/1995 | Salley et al. | 324/429 |
| 5,426,416 A | 6/1995 | Jefferies et al. | 340/664 |
| 5,432,426 A | 7/1995 | Yoshida | 320/20 |
| 5,434,495 A | 7/1995 | Toko | 320/44 |
| 5,435,185 A | 7/1995 | Eagan | 73/587 |
| 5,442,274 A | 8/1995 | Tamai | 320/23 |
| 5,445,026 A | 8/1995 | Eagan | 73/591 |
| 5,449,996 A | 9/1995 | Matsumoto et al. | 320/20 |
| 5,449,997 A | 9/1995 | Gilmore et al. | 320/39 |
| 5,451,881 A | 9/1995 | Finger | 324/433 |
| 5,457,377 A | 10/1995 | Jonsson | 320/5 |
| 5,469,043 A | 11/1995 | Cherng et al. | 320/31 |
| 5,485,090 A | 1/1996 | Stephens | 324/433 |
| 5,488,300 A | 1/1996 | Jamieson | 324/432 |
| 5,519,383 A | 5/1996 | De La Rosa | 340/636 |
| 5,528,148 A | 6/1996 | Rogers | 324/426 |
| 5,537,967 A | 7/1996 | Tashiro et al. | 123/792.1 |
| 5,546,317 A | 8/1996 | Andrieu | 364/481 |
| 5,548,273 A | 8/1996 | Nicol et al. | 340/439 |
| 5,550,485 A | 8/1996 | Falk | 324/772 |
| 5,561,380 A | 10/1996 | Sway-Tin et al. | 324/509 |
| 5,562,501 A | 10/1996 | Kinoshita et al. | 439/852 |
| 5,572,136 A | 11/1996 | Champlin | 324/426 |
| 5,574,355 A | 11/1996 | McShane et al. | |
| 5,583,416 A | 12/1996 | Klang | 320/22 |
| 5,585,728 A | 12/1996 | Champlin | 324/427 |
| 5,589,757 A | 12/1996 | Klang | 320/22 |
| 5,592,093 A | 1/1997 | Klingbiel | 324/426 |
| 5,596,260 A | 1/1997 | Moravec et al. | 320/30 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/48 |
| 5,621,298 A | 4/1997 | Harvey | 320/5 |
| 4,024,953 A | 5/1997 | Nailor, III | 206/344 |
| 5,633,985 A | 5/1997 | Severson et al. | |
| 5,637,978 A | 6/1997 | Kellett et al. | 320/2 |
| 5,642,031 A | 6/1997 | Brotto | 320/21 |
| 5,650,937 A | 7/1997 | Bounaga | 364/483 |
| 5,652,501 A | 7/1997 | McClure et al. | 320/17 |
| 5,653,659 A | 8/1997 | Kunibe et al. | 477/111 |
| 5,656,920 A | 8/1997 | Cherng et al. | 320/31 |
| 4,047,091 A | 9/1997 | Hutchines et al. | 363/59 |
| 5,675,234 A | 10/1997 | Greene | 320/15 |
| 5,677,077 A | 10/1997 | Faulk | 429/90 |
| 5,699,050 A | 12/1997 | Kanazawa | 340/636 |
| 5,701,089 A | 12/1997 | Perkins | 327/772 |
| 5,705,929 A | 1/1998 | Caravello et al. | 324/430 |
| 5,710,503 A | 1/1998 | Sideris et al. | 320/6 |
| 5,711,648 A | 1/1998 | Hammerslag | 414/786 |
| 5,717,336 A | 2/1998 | Basell et al. | 324/430 |
| 5,717,937 A | 2/1998 | Fritz | 395/750.01 |
| 5,739,667 A | 4/1998 | Matsuda et al. | |
| 5,747,909 A | 5/1998 | Syverson et al. | 310/156 |
| 5,754,417 A | 5/1998 | Nicollini | 363/60 |
| 5,757,192 A | 5/1998 | McShane et al. | 324/427 |
| 5,760,587 A | 6/1998 | Harvey | 324/434 |
| 5,773,978 A | 6/1998 | Becker | 324/430 |
| 5,789,899 A | 8/1998 | van Phouc et al. | 320/30 |
| 5,793,359 A | 8/1998 | Ushikubo | 345/169 |
| 5,808,469 A | 9/1998 | Kopera | 324/43.4 |
| 5,818,234 A | 10/1998 | McKinnon | 324/433 |
| 5,821,756 A | 10/1998 | McShane et al. | 324/430 |
| 5,825,174 A | 10/1998 | Parker | 324/106 |
| 5,831,435 A | 11/1998 | Troy | 324/426 |
| 5,862,515 A | 1/1999 | Kobayashi et al. | 702/63 |
| 5,872,443 A | 2/1999 | Williamson | 320/21 |
| 5,895,440 A | 4/1999 | Proctor et al. | 702/63 |

| | | | |
|---|---|---|---|
| 5,914,605 A | 6/1999 | Bertness | 324/430 |
| 5,927,928 A | 7/1999 | Hammerslag | 414/809 |
| 5,929,609 A | 7/1999 | Joy et al. | 322/25 |
| 5,939,855 A | 8/1999 | Proctor et al. | 320/104 |
| 5,939,861 A | 8/1999 | Joko et al. | |
| 5,945,829 A | 8/1999 | Bertness | 324/430 |
| 5,951,229 A | 9/1999 | Hammerslag | 414/398 |
| 5,961,561 A | 10/1999 | Wakefield, II | 701/29 |
| 5,961,604 A | 10/1999 | Anderson et al. | 709/229 |
| 5,969,625 A | 10/1999 | Russo | 340/636 |
| 6,002,238 A | 12/1999 | Champlin | 320/134 |
| 6,008,652 A | 12/1999 | Theofanopoulos et al. | 324/434 |
| 6,009,369 A | 12/1999 | Boisvert et al. | 701/99 |
| 6,031,354 A | 2/2000 | Wiley et al. | 320/116 |
| 6,037,751 A | 3/2000 | Klang | 320/160 |
| 6,037,777 A | 3/2000 | Champlin | 324/430 |
| 6,051,976 A | 4/2000 | Bertness | 324/426 |
| 6,072,299 A | 6/2000 | Kurie et al. | 320/112 |
| 6,072,300 A | 6/2000 | Tsuji | 320/116 |
| 6,081,098 A | 6/2000 | Bertness et al. | 320/134 |
| 6,091,245 A | 7/2000 | Bertness | 324/426 |
| 6,094,033 A | 7/2000 | Ding et al. | 320/132 |
| 6,104,167 A | 8/2000 | Bertness et al. | 320/132 |
| 6,114,834 A | 9/2000 | Parise | 320/109 |
| 6,137,269 A | 10/2000 | Champlin | 320/150 |
| 6,140,797 A | 10/2000 | Dunn | 320/105 |
| 6,144,185 A | 11/2000 | Dougherty et al. | 320/132 |
| 6,150,793 A | 11/2000 | Lesesky et al. | 320/104 |
| 6,161,640 A | 12/2000 | Yamaguchi | 180/65.5 |
| 6,163,156 A | 12/2000 | Bertness | 324/426 |
| 6,172,483 B1 | 1/2001 | Champlin | 320/134 |
| 6,172,505 B1 | 1/2001 | Bertness | 324/430 |
| 6,181,545 B1 | 1/2001 | Amatucci et al. | 361/502 |
| 6,222,369 B1 | 4/2001 | Champlin | 324/430 |
| 6,225,808 B1 | 5/2001 | Varghese et al. | 324/426 |
| 6,236,332 B1 | 5/2001 | Conkright et al. | 340/825.06 |
| 6,249,124 B1 | 6/2001 | Bertness | 324/426 |
| 6,250,973 B1 | 6/2001 | Lowery et al. | 439/763 |
| 6,254,438 B1 | 7/2001 | Gaunt | 439/755 |
| 6,259,254 B1 | 7/2001 | Klang | 324/427 |
| 6,262,563 B1 | 7/2001 | Champlin | 320/134 |
| 6,294,896 B1 | 9/2001 | Champlin | 320/134 |
| 6,294,897 B1 | 9/2001 | Champlin | 320/153 |
| 6,304,087 B1 | 10/2001 | Bertness | 324/426 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 320/132 |
| 6,316,914 B1 | 11/2001 | Bertness | 320/134 |
| 6,323,650 B1 | 11/2001 | Bertness et al. | |
| 6,329,793 B1 | 12/2001 | Bertness et al. | |
| 6,331,762 B1 | 12/2001 | Bertness | |
| 6,332,113 B1 | 12/2001 | Bertness | |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,359,441 B1 | 3/2002 | Bertness | 324/426 |
| 6,363,303 B1 | 3/2002 | Bertness | 701/29 |

OTHER PUBLICATIONS

"A Bridge for Measuring Storage Battery Resistance", by E. Willilhncanz, *The Electrochemical Society*, preprint 79–20, Apr. 1941, pp. 253–258.

"Battery Impedance", by E. Willihnganz et al., *Electrical Engineering*, Sep. 1959, pp. 922–925.

"JIS Japanese Industrial Standard–Lead Acid Bateries for Automobiles", *Japanese Standards Association UDC*, 621.355.2:629.113.006, Nov. 1995.

IEEE Recommended Practice For Maintenance, Testings, and Replacement of Large Lead Storage Batteries for Generating Stations and Substations, *The Institute of Electrical and Electronics Engineers, Inc., ANSI/IEEE Std.* 450–1987, Mar. 9, 1987, pp. 7–15.

"Field and Laboratory Studies to Assess the State of Health of Valve–Regulated Lead Acid Batteries: Part I Conductance/Capacity Correlation Studies", by D. Feder et al., *IEEE*, Aug. 1992, pp. 218–233.

Internal Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128–131.

"The Impedance of Electrical Storage Cells", by N.A. Hampson et al., *Journal of Applied Electrochemistry*, 1980, pp. 3–11.

"A Package for Impedance/Admittance Data Analysis", by B. Boukamp, *Solid State Ionics*, 1986, pp. 136–140.

"Precision of Impedance Spectroscopy Estimates of Bulk, Reaction Rate, and Diffusion Parameters", by J. Macdonald et al., *J. Electroanal, Chem.*, 1991, pp. 1–11.

"Electrochemical Impedance Spectroscopy in Battery Development and Testing", *Batteries International*, Apr. 1997, pp. 59 and 62–63.

"Battery Impedance", by E. Willihnganz et al., *Electrical Engineering*, Sep. 1959, pp. 922–925.

"Determining The End of Battery Life", by S. DeBardelaben, *IEEE*, 1986, pp. 365–368.

"A Look at the Impedance of a Cell", by S. Debardelaben, *IEEE*, 1988, pp. 394–397.

BATTERY CLAMP WITH EMBEDDED ENVIRONMENT SENSOR

BACKGROUND OF THE INVENTION

The present invention relates to rechargeable storage batteries. More specifically, the present invention relates to battery clamps used to couple to such storage batteries.

Chemical batteries which create electricity from chemical reactions have been known for many years. Such batteries are becoming increasingly important and have found uses throughout industry. These uses include automobiles, UPS systems, etc.

One advantage of chemical batteries, such as lead acid storage batteries, is that they can be charged and the chemical process reversed by forcing electricity through the battery. Charging systems are widely known in the art and are widely available in the consumer market. One of the most common techniques for recharging storage batteries is simply placing a voltage source across the battery having a voltage which is greater than the battery voltage. The voltage difference will cause a charging current to flow through the battery causing a reversal of the chemical reaction. The charging current decreases as the voltage difference between the charging voltage and the battery voltage decreases. Typically, the charging voltage is selected to be greater than the nominal battery voltage in order to cause a slight overcharge of the battery. The battery is deemed to be "charged" when the battery will accept no additional current. Frequently, this is through a simple visual inspection of an amp meter on the battery charger by the user of the battery charger. The battery charger may then be switched off. However, such a simple technique for recharging a battery, although inexpensive, does not provide optimum battery charging and provides very little information about the battery itself. The device does not permit optimal rapid charging of the battery and may lead to excessive overcharging of the battery that can permanently damage the battery and even lead to boiling of the battery electrochemicals. On the other hand, undercharging of a battery results in a battery that is not capable of providing its full potential output. These problems are exacerbated in situations where the battery is rapidly charged using large charging current.

More sophisticated chargers have been developed in which battery voltage is monitored in an attempt to determine when a battery is fully charged. In addition, techniques have been developed for charging a battery in which the condition of the battery is monitored throughout the charging process.

In spite of the above measures taken to determine when exactly a battery is charged, the charging process is often accompanied by the emission of gases. This "gassing" can significantly shorten the life of a battery. Also, the temperature of the battery suddenly rises when the battery is fully charged.

Typically, separate sensors are used to monitor the battery environment during charging. Employing separate sensors for battery charging makes the equipment more complex for a user to operate in a harsh and often constrained environment associated with, for example, automotive battery charging.

SUMMARY OF THE INVENTION

In accordance with one aspect of the present invention, an apparatus configured to couple to a battery contact is provided. The apparatus includes an electrical connector for connection to a battery contact and an environment sensor integrated with the electrical connector, the environment sensor senses changes in a battery environment during battery charging or testing.

In accordance with another aspect of the present invention, a battery charging system employing an electrical connector with a coupled environment sensor is provided.

BRIEF DESCRIPTION OF THE DRAWINGS

FIG. 2 is a simplified block diagram of a combined clamp and sensing device of the present invention.

FIG. 3 shows a combined clamp and sensing device that provides a Kelvin connection to a battery in accordance with an embodiment of the present invention.

FIGS. 4-1 and 4-2 show simplified block diagrams of combined clamp and sensing devices in accordance with embodiments of the present invention.

FIGS. 5-1 to 5-4 show perspective views of combined clamp and sensing devices in accordance with other embodiments of the present invention.

DETAILED DESCRIPTION OF ILLUSTRATIVE EMBODIMENTS

Figure 1:
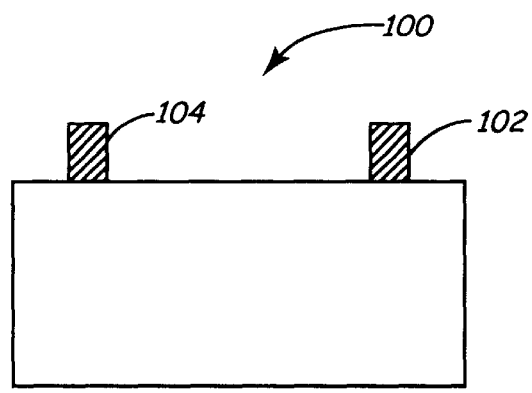
FIGS. 1-1 to 1-3 illustrate cross-sections of prior art battery contacts that the combined clamp and sensing device of the present invention is capable of grasping.
Figures 1, 2:
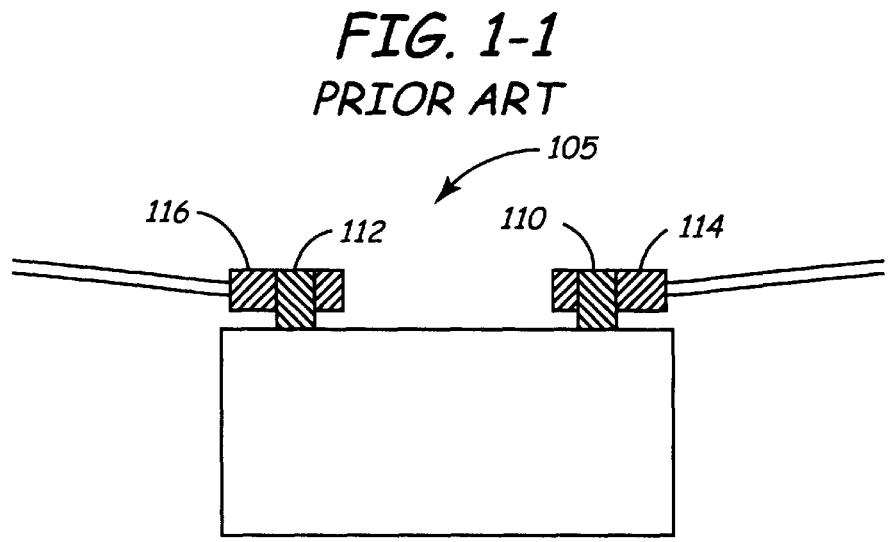
Figures 1, 2, 3:
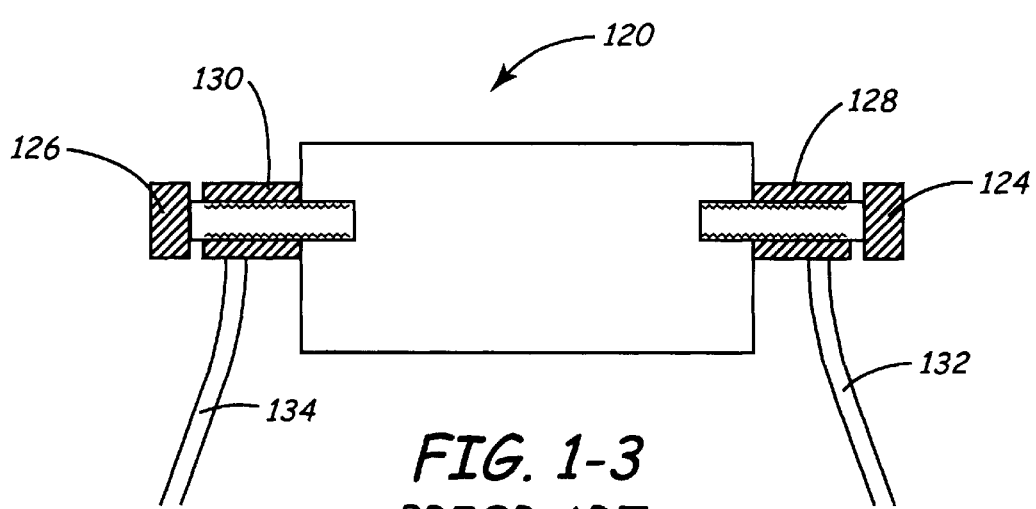
Figure 2:
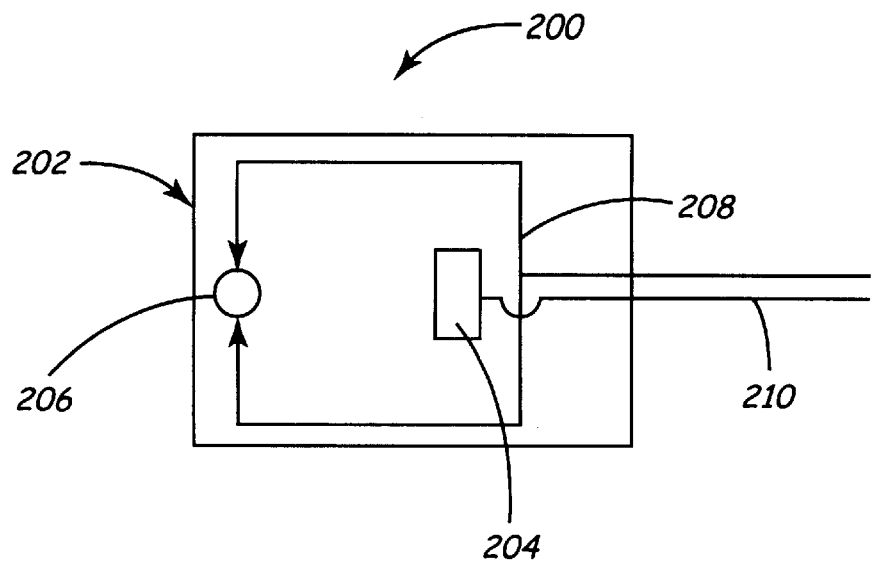
Figure 3:
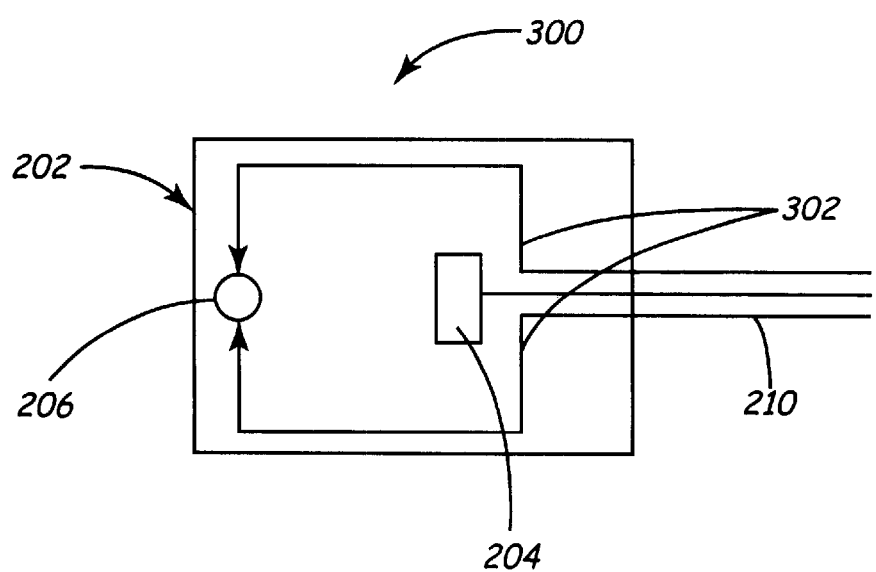

In the discussion below, the term "battery contact" is used to define a portion of the battery onto which the combined clamp and sensing device of the present invention can be applied. Prior art FIGS. 1-1 to 1-3 illustrate examples of different battery contacts that the combined clamp and sensing device of the present invention is capable of grasping. In FIG. 1-1, battery contact refers to either terminal 102 or terminal 104 of battery 100. FIG. 1-2 shows battery 105 connected with clamps that connect to an external circuit (not shown). Here the term battery contact refers to a battery terminal with an attached clamp. Thus, either terminal 110 with attached clamp 114 or terminal 112 with attached clamp 116 qualifies as a battery contact to which the combined clamp and sensing device of the present invention can be applied. Similarly, FIG. 1-3 shows battery 120 with clamps that grip bolts (terminals) connected to sides of battery 120 and connect to an external circuit (not shown). Here either bolt 124 with attached clamp 128 or bolt 126 with attached clamp 130 qualifies as a battery contact. The term battery contact is not restricted in application to the illustrative examples of FIGS. 1-1 to 1-3.

FIG. 2 shows a combined clamp and sensing device 200 in accordance with an embodiment of the present invention. Combined clamp and sensing device 200 is designed to permit application to a battery contact or disconnection thereto when desired. Combined clamp and sensing device 200 includes an electrical connector, shown generally by block 202, that grips on to battery contact 206 preferably with a large force in order to withstand high current when, for example, an automobile starts. Various types of electrical connectors, some of which are described further below, can be used for grasping battery contact 206. Also included is sensing device 204 which is integrated with electrical connector 202. Sensing device 204 senses changes in the battery environment during battery charging or testing. Examples of sensing devices include combustible gas sensors, toxic gas sensors and temperature sensors. These sensing devices alert a user and/or trigger shut down of a battery charging/testing process when an unsafe condition arises. Connection to external electrical circuits from electrical connector 202 is provided by single-ended electrical connection 208 which is embedded within electrical connector 202. Sensing device 204 is connected to external circuitry via connection 210. Thus, a single combined clamp and sensing device 200 can be applied to a battery contact to connect charge/test equipment and simultaneously monitor the battery environment during the charging/testing process.

FIG. 3 shows combined clamp and sensing device 300 which is similar to combined clamp and sensing device 200. The same reference numerals have been used to represent the same or similar elements. A Kelvin electrical connection 302 is provided in combined clamp and sensing device 300 instead of the single-ended electrical connection 208 of combined clamp and sensing device 200 with all other elements being substantially similar. Kelvin connection 302, described in detail further below, is used for advanced battery testing techniques and includes two electrical connections or probes for each battery contact.

Figures 1, 4:
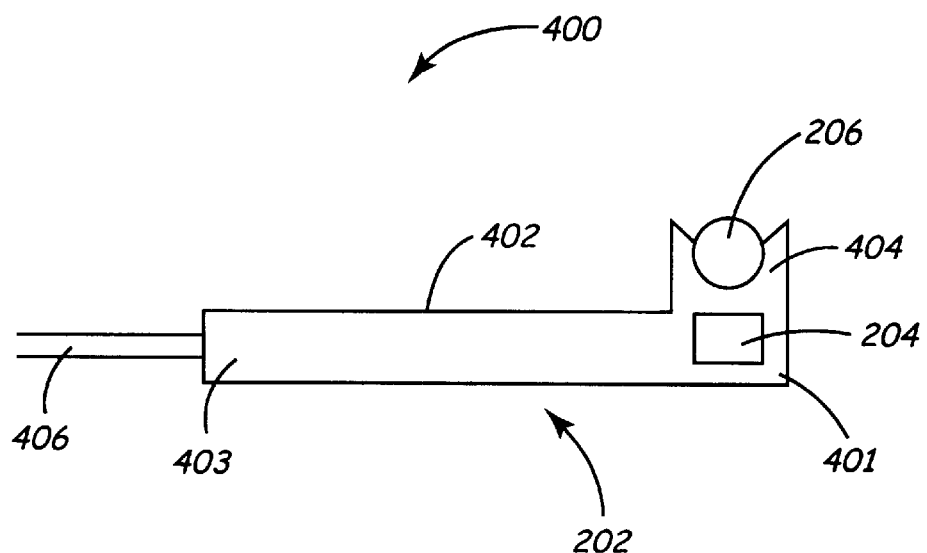
Figures 2, 4:
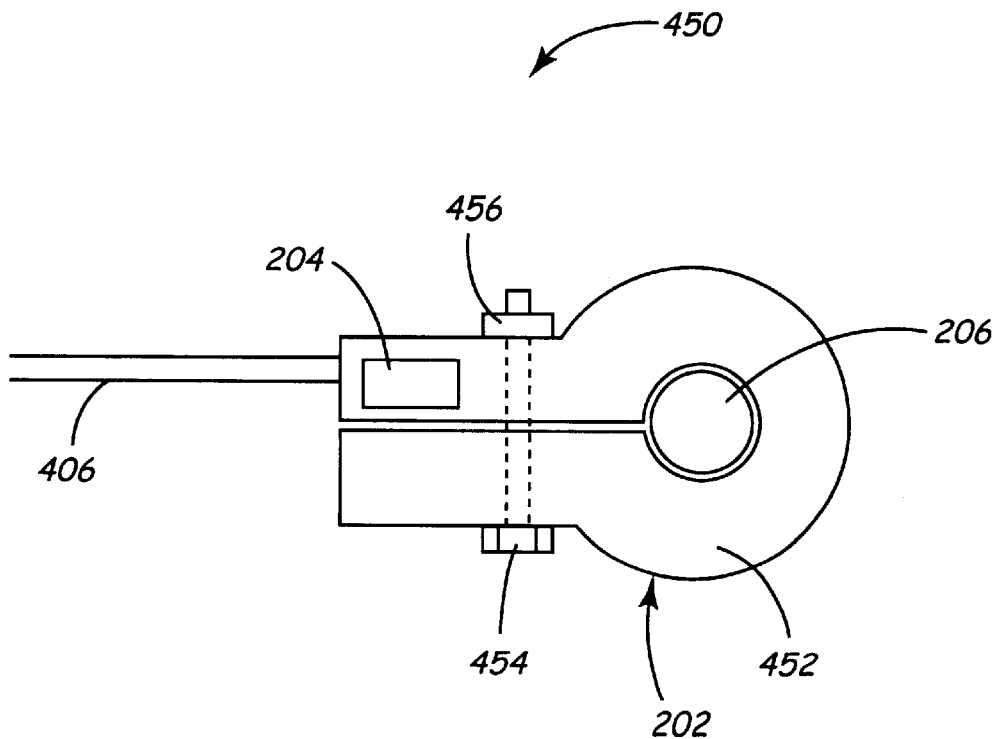

FIG. 4-1 is a simplified block diagram illustrating combined clamp and sensing device 400 in accordance with another embodiment of the present invention. Combined clamp and sensing device 400 includes electrical connector 202, sensor 204 and electrical connection 406. Electrical connector 202 includes an arm 402 and grasping member 404. Grasping member 404 is connected to front end 401 of arm 402 and grips on to battery contact 206. Sensor 204 is also connected to front end 401 of arm 402. Electrical connection 406 shown at rear end 403 of arm 402 runs within arm 402 and connects grasping member 404 and sensor 204 to external circuitry. FIG. 4-2 illustrates a block diagram of a combined clamp and sensing device 450 similar to device 400 (of FIG. 4-1) in accordance with another embodiment of the present invention. Combined clamp and sensing device 450 includes electrical connector 202 that has a grasping mechanism 452 that is held around battery contact 206 by bolt 454 and nut 456 (bolt-on clamp). Grasping member 452 may also be flexible clip-on clamp that does not require a bolt and nut to be held in place. Device 450 includes sensor 204 connected to grasping mechanism 452. Electrical connection 406 connects device 450 to external circuitry.

Figures 1, 5:
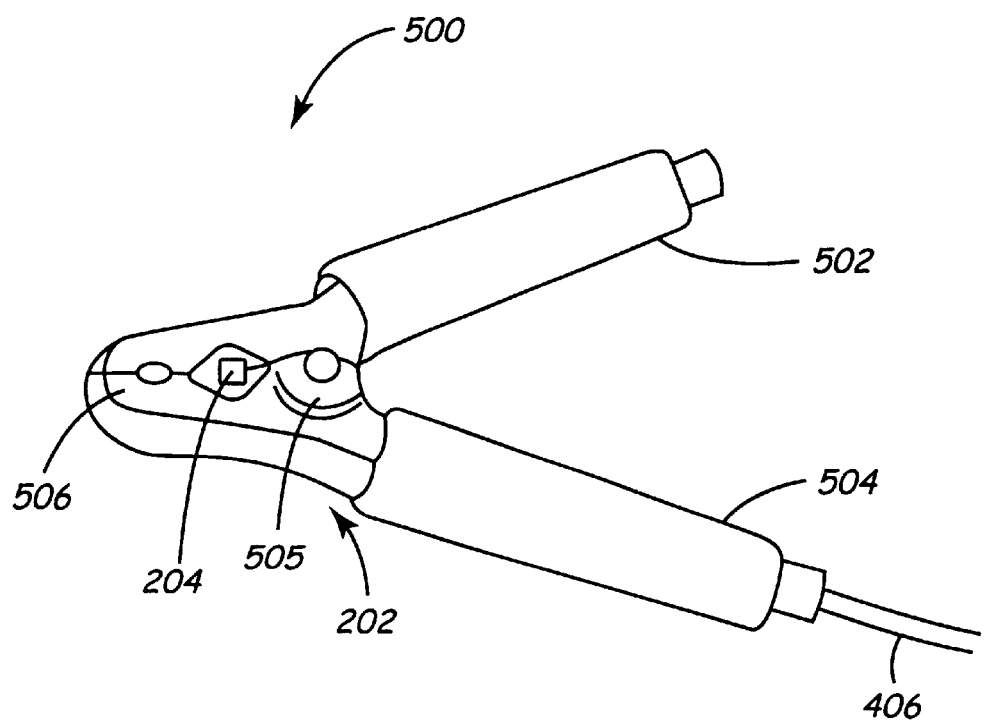
Figures 2, 5:
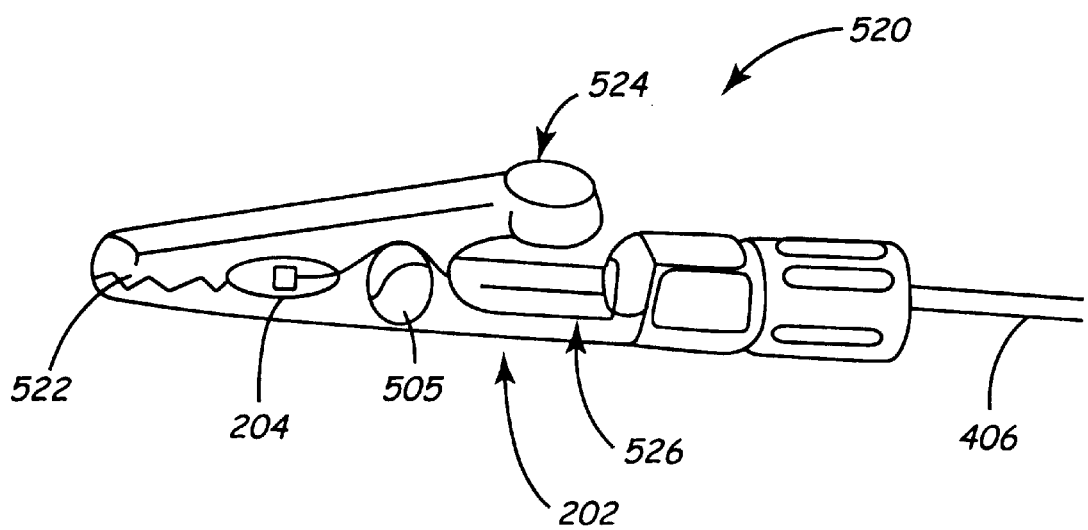
Figures 3, 5:
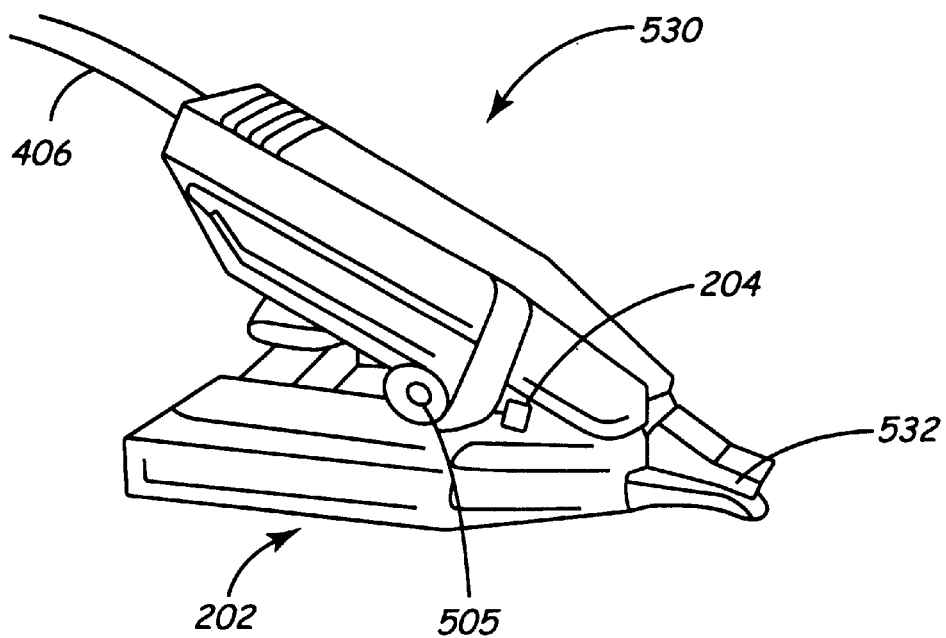
Figures 4, 5:
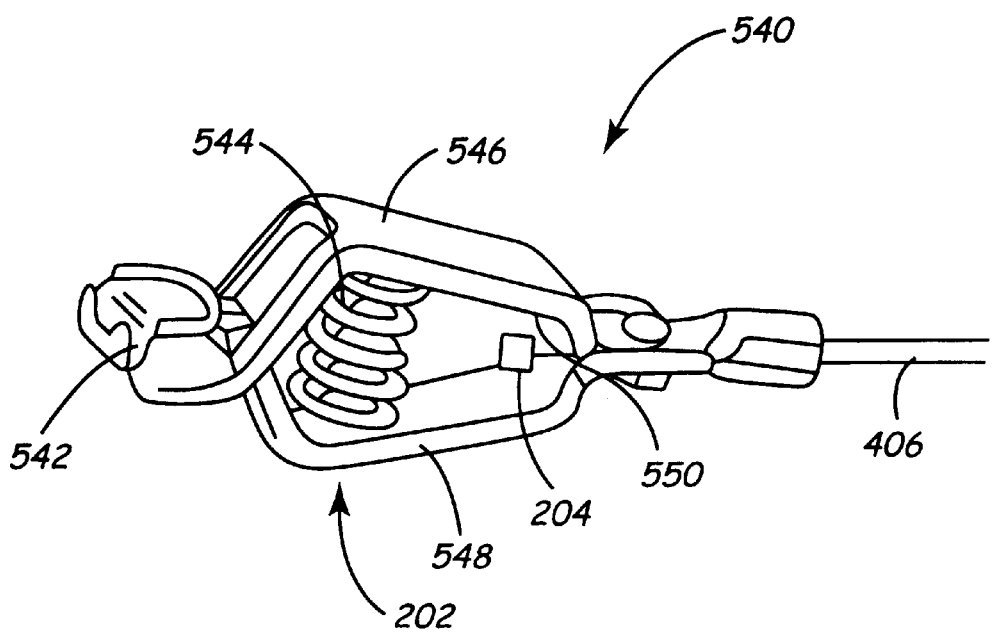

FIGS. 5-1 to 5-4 illustrate perspective views of combined clamp and sensing devices which include clip-type electrical connectors for grasping battery contacts.

FIG. 5-1 shows a perspective view of a combined clamp and sensing device 500 in accordance with another embodiment of the present invention. Device 500 includes an electrical connector 202 which is a Plier-Type clip having arms 502 and 504 connected together by pivot 505 and a gripping portion 506 that can be opened or closed with the help of arms 502 and 504. Sensor 505 is shown connected to the Plier-Type clip at pivot 505 but may be connected to different portions of the Plier-Type clip. Electrical connection 406 connects the Plier-Type clip and the sensor to external circuitry. In FIG. 5-2, combined clamp and sensing device 520 includes an electrical connector 202 which is an Alligator or Crocodile clip having meshing jaws 522, used for making temporary electrical connections. Sensor 204 is show connected to the Alligator clip at pivot 505. Meshing jaws 522 are opened by applying force on upper portion 524 in a direction towards lower portion 526. Electrical connection 406 couples the alligator clip to external electrical circuits. FIG. 5-3 shows a combined clamp and sensing device 530 with electrical connector 202 being a Kelvin clip used for 4-wire resistance measurements. Jaws 532 are electrically isolated when the clip is open and shorted when the clip is closed. Sensor 204 is connected near pivot 505 and electrical connection 406 couples the Kelvin clip to external circuitry. In FIG. 5-4, combined clamp and sensing device 540 includes a electrical connector 202 which is a Pee-Wee clip, used for making temporary electrical connections. Typically, Pee-Wee clips are made of copper. Grasping mechanism 542 is opened/closed by the compression/expansion of spring 544 accomplished by moving upper portion 546 and lower portion 548 towards or away from each other. Sensor 204 is coupled to the Pee-Wee clip at rear junction 550 of upper portion 546 and lower portion 548. Electrical connection 406 couples the Pee-Wee clip to external circuitry.

The different clamps (electrical connectors) employed in the embodiments of the combined clamp and sensing devices described above are only illustrative in nature and those skilled in the art will appreciate that the present invention may be practiced with any clamp (electrical connector) capable of electrically coupling to a battery contact. Also, the sensing device may be positioned anywhere on the electrical connector. Illustrative examples of sensing devices are included below.

One example of a sensing device that may be employed in the present invention for detecting combustible gases is a hydrogen gas sensor. Any toxic gas sensor that senses Carbon Monoxide, Hydrogen Sulphide, etc., can also be employed in the present invention. Multigas sensors that sense both combustible and toxic gas may also be employed.

Typically, the temperature of the battery suddenly rises when the battery is fully charged. Thus, a temperature sensor may be employed to determine when exactly the battery is charged. A preferred temperature sensor would be one that can rapidly determine the temperature of the battery without making physical contact with the battery because contact-type temperature sensors have to be cooled to room temperature before the charging process begins, to avoid inaccurate readings. A non-contact infrared thermoplie reacts quickly to temperature changes and provides accurate readings, and is therefore suitable for use in the present invention. An example of such a sensor is an infrared sensor from Melexis Inc. When employed in the battery clamp, the temperature sensor can sense the temperature of the battery contact to determine when the battery is charged.

Figure 6:
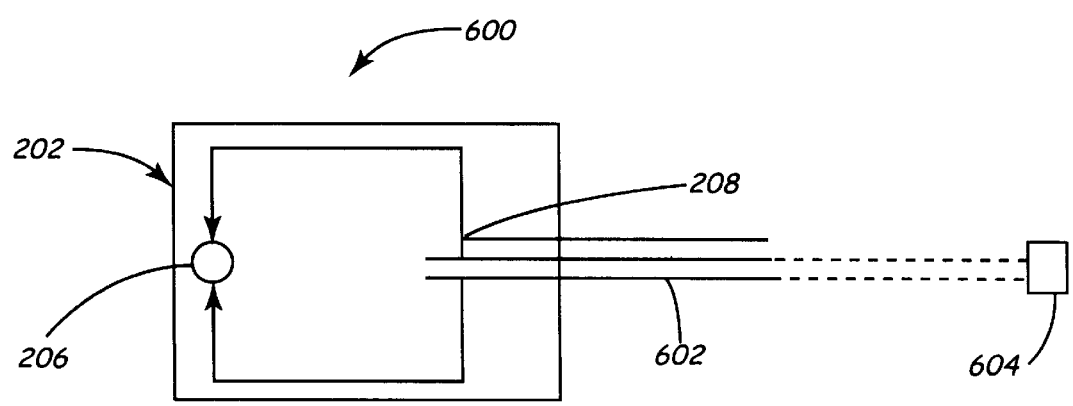
FIG. 6 shows a combined battery clamp and sensing device employing a conduit for sucking air from the battery environment to a remote sensor in accordance with another embodiment of the present invention.

Although temperature sensors need to be positioned close to the battery, gas sensors can be at a remote location as long as air from the battery environment is provided to the gas sensors. FIG. 6 shows a combined battery clamp and sensing device 600 using a conduit 602 through which air is sucked from the battery environment and provided to a gas sensor 604 at a remote location. This embodiment of the present invention is structurally simple and easy to operate.

Figure 7:
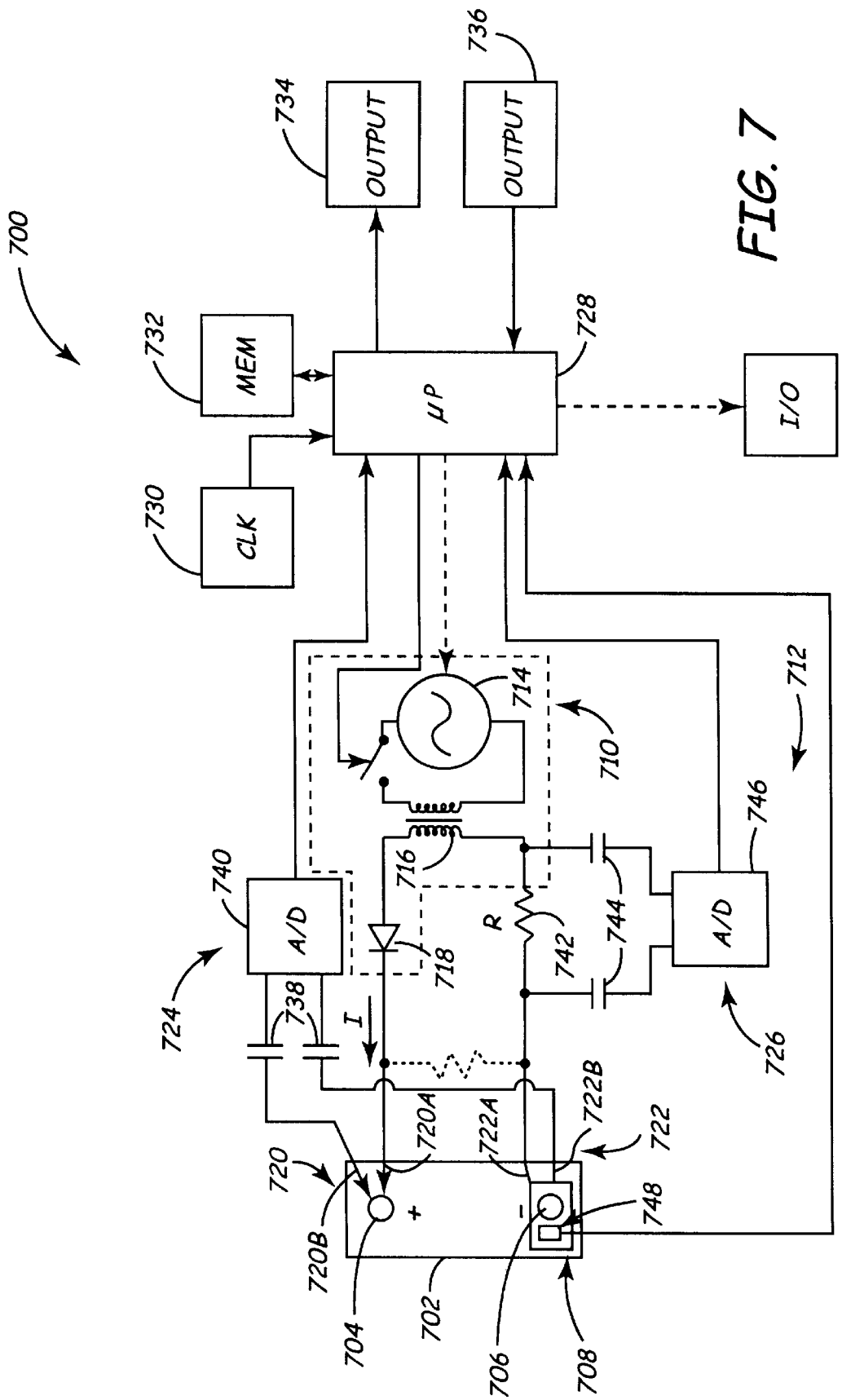
FIG. 7 is a simplified block diagram of a battery charging system incorporating a combined battery clamp and sensing device in accordance with the present invention.

FIG. 7 is a simplified block diagram of a battery charging system 700 with the present invention is useful. System 700 is shown coupled to battery 702. System 700 includes battery charger circuitry 710 and test circuitry 712. Battery charge circuitry 710 generally includes AC source 714 transformer 716 and rectifier 718. System 700 couples to battery 700 through electrical connection 720 which couples to the positive battery contact 704 and electrical connection 722 which couples to the negative battery contact 706. In one preferred embodiment, a four point (or Kelvin) connection technique is used in which battery charge circuitry 710 couples to battery 700 through electrical connections 720A and 722A while battery testing circuitry 712 couples to battery 702 through electrical connections 720B and 722B. Coupling between battery contacts 704 and 706 and electrical connections 720 and 720 is provided by combined battery clamp and sensing device of the present invention that grasps on to each battery contact. For simplification, only one combined battery clamp and sensing device 708 is shown grasping battery contact 706.

Battery testing circuitry 712 includes voltage measurement circuitry 724 and current measurement circuitry 726 which provide outputs to microprocessor 728. Microprocessor 728 also couples to a system clock 730 and memory 732 which is used to store information and programming instructions. In the embodiment of the invention shown in FIG. 1, microprocessor 728 also couples to user output to circuitry 734 and user input circuitry 736.

Voltage measurement circuitry 724 includes capacitors 738 which couple analog to digital converter 740 to battery 702 thorough electrical connections 720B and 722B. Any type of coupling mechanism may be used for element 738 and capacitors are merely shown as one preferred embodiment. Further, the device may also couple to DC signals. Current measurement circuitry 726 includes a shunt resistor (R) 742 and coupling capacitors 744. Shunt resistor 742 is coupled in series with battery charging circuitry 710. Other current measurement techniques are within the scope of the invention including Hall-Effect sensors, magnetic or inductive coupling, etc. An analog to digital converter 746 is connected across shunt resistor 742 by capacitors 744 such that the voltage provided to analog to digital converter 746 is proportional to a current I flowing through battery 702 due to charging circuitry 710. Analog to digital converter 746 provides a digitized output representative of this current to microprocessor 728.

During operation, AC source 714 is coupled to battery 702 through transformer 716 and rectifier 718. Rectifier 718 provides half way rectification such that current I has a non-zero DC value. Of course, full wave rectification or other AC sources may also be used. Analog to digital converter 746 provides a digitized output to microprocessor 728 which is representative of current I flowing through battery 702. Similarly, analog to digital converter 724 provides a digitized output representative of the voltage across the positive and negative terminals of battery 702. Analog to digital converters 724 and 746 are capacitively coupled to battery 702 such that they measure the AC components of the charging signal.

Microprocessor 728 determines the conductance of battery 702 based upon the digitized current and voltage information provided by analog to digital converters 746 and 724, respectively. Microprocessor 728 calculates the conductance of battery 702 as follows:

$$\text{Conductance} = G = \frac{1}{V} \qquad \text{Eq. 1}$$

where I is the AC charging current and V is the AC charging voltage across battery 702. Note that in one preferred embodiment the Kelvin connections allow more accurate voltage determination because these connections do not carry substantial current to cause a resultant drop in the voltage measured.

The battery conductance is used to monitor charging of battery 702. Specifically, it has been discovered that as a battery is charged the conductance of the battery rises which can be used as feedback to the charger. This rise in conductance can be monitored in microprocessor 728 to determine when the battery has been fully charged.

In accordance with the present invention, sensing device 740 of combined battery clamp and sensing device 708 is coupled to microprocessor 728 to monitor for unsafe conditions and increased temperature in the battery environment. System 700 can be shut off when feedback from sensing device 708 indicates that the battery environment is unsafe or the temperature of the battery has suddenly risen.

Figure 8:
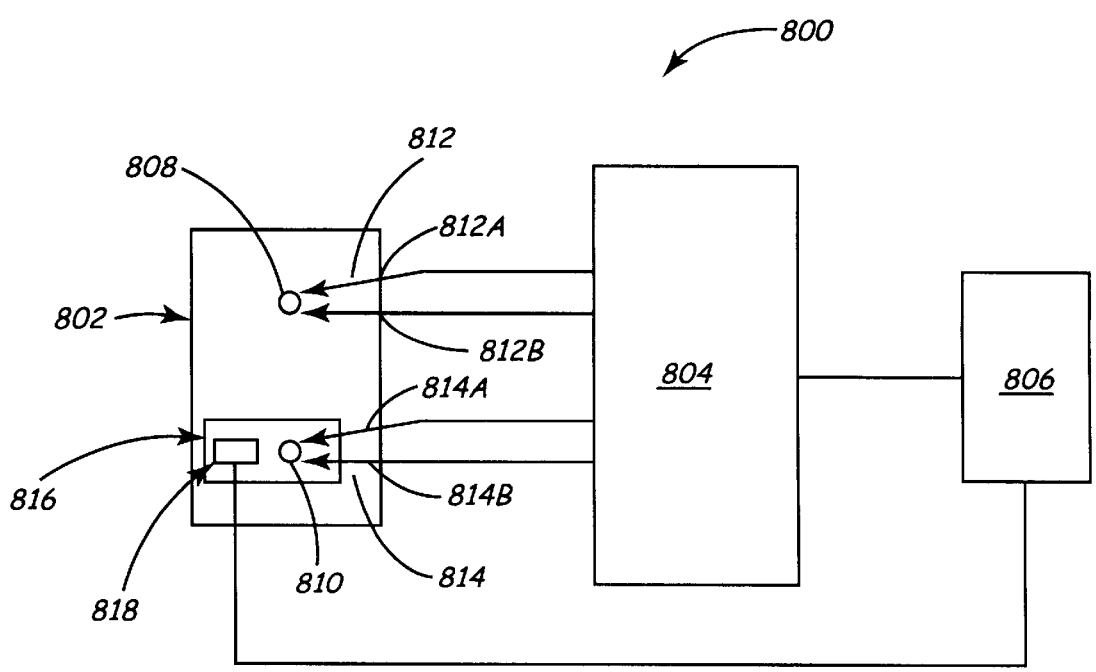
FIG. 8 is a simplified block diagram of a battery testing system 800 using the present invention.

FIG. 8 is a simplified block diagram of a battery testing system 800 using the present invention. System 800 is shown coupled to battery 802. System 800 includes battery testing circuitry 804 and microprocessor 806. System 800 couples to battery contacts 808 and 810 through electrical connections 812 and 814 respectively. In one preferred embodiment, a four point (or Kelvin) connection technique is used. Here, electrical connection 812 includes a first connection 812A and second connection 812B and connection 814 includes a first connection 814A and a second connection 814B. Coupling between battery contacts 808 and 810 and electrical connections 812 and 814 is provided by combined battery clamp and sensing device of the present invention that grasps on to each battery contact. For simplification, only one combined battery clamp and sensing device 816 is shown grasping battery contact 810. Sensing device 818 of combined battery clamp and sensing device 816 is coupled to microprocessor 806. Sensing device 818 monitors the battery environment and provides feedback to microprocessor 806 in a manner substantially similar to that described in the explanation for battery charging system 700 above.

In addition to being useful for battery charging and testing equipment, the present invention may also be employed to grip battery contacts in automobiles and thereby provide feedback of the condition of the automobile battery environment.

Although the present invention has been described with reference to preferred embodiments, workers skilled in the art will recognize that changes may be made in form and detail without departing from the spirit and scope of the invention. In general, the invention is directed to a combined battery clamp and environment sensor and is not restricted to the types of clamp and environment sensor combinations described in the illustrative embodiments. The invention can be employed in battery charging, testing and other similar systems.

What is claimed is:

1. An apparatus configured to couple to a battery, comprising:
    an electrical connector adapted for electrical connection to a battery contact; and
    an environment sensor coupled to the electrical connector, the environment sensor adapted to sense changes in a battery environment during battery charging or testing.
2. The apparatus of claim 1, wherein the electrical connector is adapted to electrically couple a single ended electrical connection to the battery contact.
3. The apparatus of claim 1, wherein the electrical connector is adapted to electrically couple a Kelvin connection to the battery contact.

4. The apparatus of claim 1, wherein the electrical connector comprises:

an arm; and a grasping member positioned at a front end of the arm and adapted to grip the battery contact.

5. The apparatus of claim 1, wherein the electrical connector includes a bolt-on clamp.

6. The apparatus of claim 1, wherein the electrical connector includes a clip-on clamp.

7. The apparatus of claim 1, wherein the electrical connector comprises a Plier-Type clip.

8. The apparatus of claim 1, wherein the electrical connector comprises an Alligator clip.

9. The apparatus of claim 1, wherein the electrical connector comprises a Kelvin clip.

10. The apparatus of claim 1, wherein the electrical connector comprises a Pee-Wee clip.

11. The apparatus of claim 1, wherein the environment sensor comprises a hazardous gas sensor.

12. The apparatus of claim 1, wherein the environment sensor comprises a combustible gas sensor.

13. The apparatus of claim 1, wherein the environment sensor comprises a multigas sensor adapted to sense a plurality of combustible and toxic gases.

14. The apparatus of claim 1, wherein the environment sensor comprises a non-contact infrared thermoplie temperature sensor.

15. The apparatus of claim 1, wherein the environment sensor comprises a conduit adapted to suck air from the battery environment to a remote location where the air is sensed for combustible and toxic gases.

16. A battery charger employing the electrical connector with coupled environment sensor of claim 1.

17. The apparatus of claim 16, wherein the environment sensor is coupled to a microprocessor included in the battery charger, such that feedback from the environment sensor is used to control operation of the battery charger.

18. The apparatus of claim 16, wherein the electrical connector includes a grasping member adapted to grip the battery contact by operation of a bolt and a nut included in the grasping member.

19. A battery tester employing the electrical connector with coupled environment sensor of claim 1.

20. The apparatus of claim 1 employed in an automobile.

21. A method of coupling an electrical circuit to a battery contact, the method comprising:

(a) providing an electrical connector adapted for electrical connection of the electrical circuit to the battery contact; and (b) coupling an environment sensor to the electrical connector, the environment sensor adapted to sense changes in a battery environment during battery charging or testing.

22. The method of claim 21, wherein the electrical connector is capable of electrically coupling a single ended electrical connection to the battery contact.

23. The method of claim 21, wherein the electrical connector is capable of electrically coupling a Kelvin connection to the battery contact.

24. The method of claim 21, wherein the providing an electrical connector step (a) includes providing a bolt-on clamp.

25. The method of claim 21, wherein the providing an electrical connector step (a) includes providing a clip-on clamp.

26. The method of claim 21, wherein the providing an electrical connector step (a) includes providing a Plier-Type clip.

27. The method of claim 21, wherein the providing an electrical connector step (a) includes providing an Alligator clip.

28. The method of claim 21, wherein the providing an electrical connector step (a) includes providing a Kelvin clip.

29. The method of claim 21, wherein the providing an electrical connector step (a) includes providing a Pee-Wee clip.

30. The method of claim 21, wherein the coupling an environment sensor step (b) includes coupling a hazardous gas sensor.

31. The method of claim 21, wherein the coupling an environment sensor step (b) includes coupling a combustible gas sensor.

32. The method of claim 21, wherein the coupling an environment sensor step (b) includes coupling a multigas sensor capable of sensing a plurality of combustible and toxic gases.

33. The method of claim 21, wherein the coupling an environment sensor step (b) includes coupling a temperature sensor.

* * * * *